United States Patent
Chen

(10) Patent No.: US 11,700,195 B2
(45) Date of Patent: Jul. 11, 2023

(54) LOCALLY PROTECTING SERVICE IN A LABEL SWITCHED PATH NETWORK

(71) Applicant: Futurewei Technologies, Inc., Addison, TX (US)

(72) Inventor: Huaimo Chen, Bolton, MA (US)

(73) Assignee: Futurewei Technologies, Inc., Addison, TX (US)

(*) Notice: Subject to any disclaimer, the term of this patent is extended or adjusted under 35 U.S.C. 154(b) by 424 days.

(21) Appl. No.: 16/995,743

(22) Filed: Aug. 17, 2020

(65) Prior Publication Data
US 2020/0382413 A1 Dec. 3, 2020

Related U.S. Application Data

(63) Continuation of application No. 15/402,677, filed on Jan. 10, 2017, now Pat. No. 10,257,079, and a continuation of application No. 16/354,442, filed on Mar. 15, 2019, now Pat. No. 10,749,793, which is a continuation of application No. 15/402,677, filed on Jan. 10, 2017, now Pat. No. 10,257,079, which is a
(Continued)

(51) Int. Cl.
*H04L 45/00* (2022.01)
*H04L 45/28* (2022.01)
*H04L 45/50* (2022.01)

(52) U.S. Cl.
CPC ............ *H04L 45/22* (2013.01); *H04L 45/28* (2013.01); *H04L 45/50* (2013.01)

(58) Field of Classification Search
CPC ......... H04L 45/22; H04L 45/28; H04L 45/50; H04L 45/54
See application file for complete search history.

(56) References Cited

U.S. PATENT DOCUMENTS

| | | | |
|---|---|---|---|
| 8,259,564 B1* | 9/2012 | Gredler | G06F 11/2005 370/227 |
| 9,178,798 B2 | 11/2015 | Esale et al. | |
| 9,559,941 B2 | 1/2017 | Chen | |

(Continued)

OTHER PUBLICATIONS

H. Chen et al., Extensions to RSVP-TE for LSP Egress Local Protection draft-chen-mpls-p2mp-egress-protection-10.txt. Nov. 28, 2013, 15 pages.
(Continued)

*Primary Examiner* — Chi H Pham
*Assistant Examiner* — Weibin Huang
(74) *Attorney, Agent, or Firm* — Conley Rose, P.C.

(57) ABSTRACT

A network node that provides egress fault protection for a primary egress node. The network node may receive a service label associated with an application from a primary egress node of a primary label switched path (LSP). The network node may use the service label to add a forwarding entry into a forwarding table associated with the primary egress node. Following a fault in the primary egress node, the network node may receive a data packet comprising an LSP label and the service label from a partial backup LSP. The network node may use the LSP label to locate the forwarding table associated with the primary egress node. The service label may be used to deliver the data packet to a destination node according to the forwarding table associated with the primary egress node.

19 Claims, 9 Drawing Sheets

Related U.S. Application Data continuation of application No. 14/302,743, filed on Jun. 12, 2014, now Pat. No. 9,559,941.

(60) Provisional application No. 61/841,726, filed on Jul. 1, 2013.

(56) References Cited

U.S. PATENT DOCUMENTS

| | | | |
|---|---|---|---|
| 10,257,079 | B2 | 4/2019 | Chen |
| 10,749,793 | B2* | 8/2020 | Chen ................. H04L 45/28 |
| 2005/0083928 | A1 | 4/2005 | Sivabalan et al. |
| 2005/0097219 | A1* | 5/2005 | Goguen .............. H04L 45/28 709/239 |
| 2007/0036072 | A1* | 2/2007 | Raj .................... H04L 45/50 370/225 |
| 2010/0177631 | A1* | 7/2010 | Chen ................. H04L 45/00 370/221 |
| 2011/0199891 | A1* | 8/2011 | Chen ................. H04L 45/22 370/255 |
| 2011/0211445 | A1 | 9/2011 | Chen |
| 2012/0092986 | A1 | 4/2012 | Chen |
| 2012/0224579 | A1* | 9/2012 | Ashwood-Smith ................... H04L 12/4633 370/392 |
| 2013/0121169 | A1* | 5/2013 | Zhao .................. H04L 45/22 370/242 |
| 2014/0064278 | A1* | 3/2014 | G. Santos .......... H04L 45/54 370/392 |
| 2014/0177638 | A1 | 6/2014 | Bragg et al. |
| 2015/0207724 | A1* | 7/2015 | Choudhury .......... H04L 47/12 370/255 |

OTHER PUBLICATIONS

Chen, H. et al. "Extensions to RSVP-TE for P2MP LSP Egress Local Protection," draft-chen-mpls-p2mp-egress-protection-00.txt Mar. 1, 2010, 9 pages.
Chen, H. et al."Extensions to RSVP-TE for P2MP LSP Egress Local Protection," draft-chen-mpls-p2mp-egress-protection-01.txt, Jul. 12, 2010, 12 pages.
Chen, H. et al."Extensions to RSVP-TE for P2MP LSP Egress Local Protection," draft-chen-mpls-p2mp-egress-protection-02.txt, Jan. 11, 2011, 12 pages.
Chen, H. et al."Extensions to RSVP-TE for P2MP LSP Egress Local Protection," draft-chen-mpls-p2mp-egress-protection-03.txt, Jul. 11, 2011, 11 pages.
Chen, H. et al."Extensions to RSVP-TE for P2MP LSP Egress Local Protection," draft-chen-mpls-p2mp-egress-protection-04.txt, Oct. 30, 2011, 12 pages.
Chen, H. et al."Extensions to RSVP-TE for P2MP LSP Egress Local Protection," draft-chen-mpls-p2mp-egress-protection-05.txt, Mar. 13, 2012, 13 pages.
Chen, H. et al."Extensions to RSVP-TE for P2MP LSP Egress Local Protection," draft-chen-mpls-p2mp-egress-protection-06.txt, Jul. 16, 2012, 13 pages.
Chen, H. et al."Extensions to RSVP-TE for P2MP LSP Egress Local Protection," draft-chen-mpls-p2mp-egress-protection-07.txt, Oct. 20, 2012, 13 pages.
Chen, H. et al:"Extensions to RSVP-TE for P2MP LSP Egress Local Protection," draft-chen-mpls-p2mp-egress-protection-08.txt, Feb. 25, 2013, 26 pages.
Chen, H. et al:"Extensions to RSVP-TE for P2MP LSP Egress Local Protection," draft-chen-mpls-p2mp-egress-protection-09.txt. May 28, 2013, 14 pages.
Chen, H. et al:"Extensions to RSVP-TE for P2MP LSP Egress Local Protection," draft-chen-mpls-p2mp-egress-protection-11.txt, Feb. 10, 2014, 15 pages.
Chen, H. et al., "Extensions to RSVP-TE for LSP Egress Local Protection," draft-ietf-mpls-rsvp-egress-protection-02 Oct. 26, 2014, 16 pages.
Chen, H. et al., "Extensions to RSVP-TE for LSP Egress Local Protection," draft-ietf-teas-rsvp-egress-protection-00.txt, Dec. 29, 2014, 16 pages.
Le Roux, J. L., et al, "P2MP MPLS-TE Fast Reroute with P2MP Bypass Tunnels," draft-leroux-mpls-p2mp-te-bypass-01.txt, Mar. 2007, 11 pages.
Bradner, S., et al. Key words for use in RFCs to Indicate Requirement Levels, RFC 2119, Mar. 1997, 3 pages.
Braden, R., Ed., et al., "Resource ReserVation Protocol (RSVP) Version 1 Functional Specification," RFC 2205, Sep. 1997, 112 pages.
Rosen, E., et al., Multiprotocol Label Switching Architecture, RFC 3031, Jan. 2001 61 pages.
Awduche, D et al., "RSVP-TE: Extensions to RSVP for LSP Tunnels," RFC 3209, Dec. 2001, 61 pages.
Berger, L., Ed., Generalized Multi-Protocol Label Switching (GMPLS) Signaling Resource Reservation Protocol-Traffic Engineering (RSVP-TE) Extensions, RFC 3473, Jan. 2003, 42 pages.
Narten, T, "Assigning Experimental and Testing Numbers Considered Useful," RFC 3692, Jan. 2004 7 pages.
Pan, P et al., Fast Reroute Extensions to RSVP-TE for LSP Tunnels, RFC 4090, May 2005, 38 pages.
Yasukawa, S, Ed., Signaling Requirements for Point-to-Multipoint Traffio-Engineered MPLS abel Switched Paths (LSPs), RFC 4461 Apr. 2006, 30 pages.
Berger, L., et al., "GMPLS Segment Recovery," RFC 4873, May 2007, 25 pages.
Aggarwal, R., Ed., et al., "Extensions to Resource Reservation Protocol Traffic Engineering (RSVP-TE) for Point-to-Multipoint TE Label Switched Paths (LSPs)," RFC 4875, May 2007, 53 pages.
Aggarwal, R., et al., MPLS Upstream label Assignment and Context-Specific Label Space, RFC 5331, Aug. 2008, 26 pages.
Aggarwal, R., et al., "Advertising a Router's Local Addresses in OSPF Traffic Engineering (TE) Extensions," RFC 5786 Mar. 2010, 7 pages.

* cited by examiner

LOCALLY PROTECTING SERVICE IN A LABEL SWITCHED PATH NETWORK

CROSS-REFERENCE TO RELATED APPLICATIONS

The present application is a continuation of U.S. patent application Ser. No. 16/354,442, which claims priorities to U.S. patent application Ser. No. 15/402,677, filed on Jan. 10, 2017, U.S. patent application Ser. No. 14/302,743, filed on Jun. 12, 2014 and U.S. Provisional Patent Application No. 61/841,726, filed Jul. 1, 2013. All of the aforementioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a conventional multiprotocol label switching (MPLS) traffic engineering (TE) label switching path (LSP) system, a backup LSP may be employed to protect a primary LSP in the event of a primary egress node failure. A conventional system may employ a multi-hop fault detection link and an end-to-end LSP as the backup LSP. Such conventional systems may be complex to operate and may not provide reliable primary egress node failure detection. For example, any failure along the multi-hop fault detection link may incorrectly indicate a primary egress node failure. Additionally, the backup LSP may be resource consuming because the backup LSP may require additional network bandwidth that can be comparable to the reserved bandwidth of the primary LSP. Furthermore, the backup LSP may reroute data traffic that causes a delay in traffic delivery. Such a delay may not be acceptable in some systems (e.g., for real time services such as internet protocol (IP) television).

SUMMARY

In one example embodiment, the disclosure includes a network node that provides egress fault protection of a primary egress node. The network node may receive a service label associated with an application from a primary egress node of a primary LSP. The network node may use the service label to add a forwarding entry into a forwarding table associated with the primary egress node. Following a fault in the primary egress node, the network node may receive a data packet comprising an LSP label and the service label from a partial backup LSP. The network node may use the LSP label to locate the forwarding table associated with the primary egress node. The service label may be used to deliver the data packet to a destination node according to the forwarding table associated with the primary egress node.

In another example embodiment, the disclosure includes a network node to provide egress fault protection of a primary egress node. The network node may receive a service label and a destination address for a client node from a second network node. The network node may add a forwarding entry in a table for the primary egress node using the service label and the destination address. In response to a primary egress node failure, the network node may receive a data packet comprising a data content portion, the service label, and an LSP label via a partial backup LSP. Using the LSP label, the network node may locate the table for the primary egress node. The network node may determine a destination node using the service label and the table and may send the data contention portion of the data packet to the destination node.

In yet another example embodiment, the disclosure includes a network node to provide egress fault protection of a primary egress node. The network node may comprise a transmitter, a receiver, and a memory device coupled to a processor. The memory device may comprise computer executable instructions such that when executed by the processor configures the network to provide egress fault protection. The network node may receive a service label using the receiver. Using the service label, a forwarding entry may be generated in a forwarding table for the primary egress node. Following a primary egress node failure, the network node may receive a data packet comprising an LSP label and the service label using the receiver. The LSP label may be used to locate the forwarding table. The service label may be used to locate the forwarding entry in the forwarding table. Upon locating the forwarding entry, the network node may send the data packet in accordance with the forwarding entry using the transmitter.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for establishing a backup LSP and controlling data traffic delivery to a client node via a backup egress node and the backup LSP. A network node may establish a partial backup LSP for protecting a primary LSP in the event of a primary egress node failure. The network node may also communicate labeling instructions to the backup egress node for delivering data traffic to a client node. Some examples of protection against failures involving the primary egress node of an MPLS TE LSP are described in U.S. patent application Ser. No. 12/683,968, titled "Protecting Ingress and Egress of a Label Switched Path," and U.S. patent application Ser. No. 12/983,587, titled "System and Method For Protecting Ingress and Egress of a Point-To-Multipoint Label Switched Path," both of which are incorporated herein by reference. The backup egress node may be configured to receive a service label from the primary egress node and to add the service label to a forwarding entry into a table (e.g., a label forwarding information base (LFIB)) for the primary egress node. Additionally, the backup egress node may be configured to use an LSP label as a context label to find the LFIB for the primary egress node and to use the service label to deliver the packet to the same destination as the primary egress node according to the forwarding entry in the LFIB.

Figure 1:
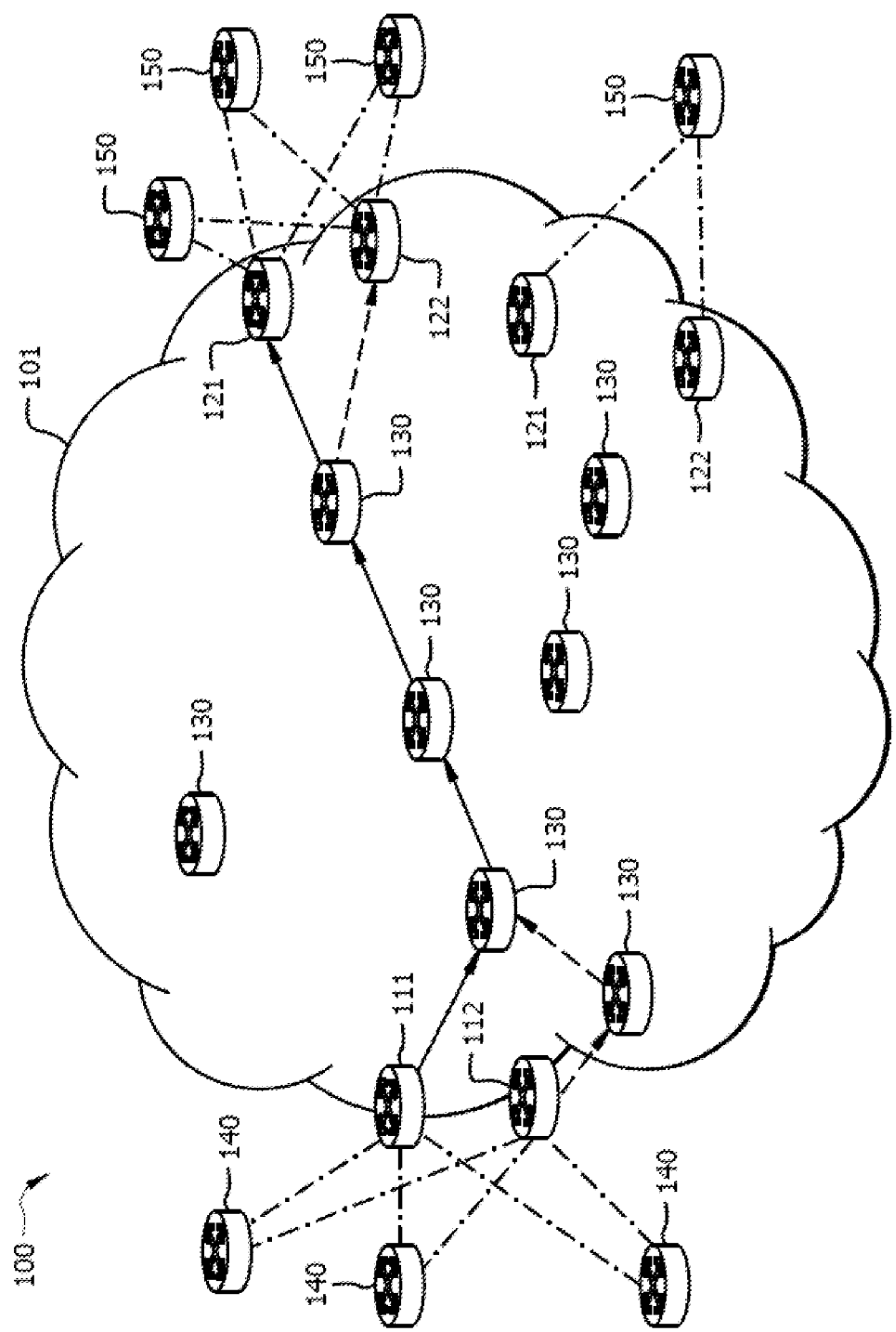
FIG. 1 is a schematic diagram of an example embodiment of a label switched system.

FIG. 1 is a schematic diagram of an example embodiment of a label switched system 100. The label switched system 100 comprises a plurality of source nodes 140 in data communication with a plurality of client nodes 150 via a label switched network 101 (e.g., a packet switched network) that comprises a plurality of network nodes. The label switched network 101 may be configured to route or switch data traffic (e.g., data packets or frames) along paths that are established using a label switching protocol, for example, using MPLS or generalized multiprotocol label switching (GMPLS). Alternatively, the packets may be routed or switched via paths established using any other suitable protocol as would be appreciated by one of ordinary skill in the art upon viewing this disclosure. The label switched network 101 may be configured to establish a plurality of LSPs between at least some of the network nodes and/or between the source node 140 and at least some of the network nodes. An LSP may be a point-to-point (P2P) LSP or point-to-multipoint (P2MP) LSP and may be used to transport data traffic (e.g., using packets and packet labels for routing).

The plurality of network nodes may be a plurality of egress nodes 121, 122 and a plurality of internal nodes 130. The egress nodes 121, 122 and internal nodes 130 may be any devices or components that support the transportation of data traffic (e.g., data packets) through the label switched network 101. For example, the network nodes may include switches, routers, and any other suitable network device for communicating packets as would be appreciated by one of ordinary skill in the art upon viewing this disclosure, or combinations thereof. The network nodes may be configured to receive data from other network nodes, to determine which network nodes to send the data to (e.g., via logic circuitry or a forwarding table), and/or to transmit the data to other network nodes. In some example embodiments, at least some of the network nodes may be label switched routers (LSRs) and may be configured to modify or update the labels of the packets transported in the label switched network 101. Additionally, at least some of the network nodes may be label edge routers (LERs) and may be configured to insert or remove the labels of the packets transported between the label switched network 101 and a source node 140.

A source node 140 and/or a client node 150 may be a network or network node that is external or distinct from the label switched network 101. Alternatively, a source node 140 and/or a client node 150 may be a portion of and/or incorporated within the label switched network 101. The label switched network 101 comprises a first ingress node (e.g., a primary ingress node) 111, a second ingress node (e.g., a backup ingress node) 112, a plurality of internal nodes 130, a plurality of first egress nodes (e.g., a primary egress node) 121, and a plurality second egress nodes (e.g., a backup egress node) 122. Although the label switched network 101 is illustrated comprising a first ingress node 111, a second ingress node 112, a plurality of internal nodes 130, a plurality of first egress nodes 121, and a plurality second egress nodes 122, in one or more example embodiments, any other suitable configuration and/or combinations thereof may be additionally or alternatively incorporated within the label switched network 101 as would be appreciated by one of ordinary skill in the art upon viewing this disclosure.

The label switched network 101 may be configured such that a plurality of LSPs (e.g., P2P LSP and/or P2MP LSP) may be established between the network nodes and/or between the networks and at least some of the network nodes. The label switched network 101 may comprise a primary LSP (e.g., a P2P LSP) configured to transport data traffic from a source node 140 to a client node 150. The primary LSP may comprise the first ingress node 111, one or more internal nodes 130, and a first egress node 121. The label switched network 101 further comprises a backup LSP (e.g., a backup P2P LSP). The backup LSP may comprise one or more bypass P2P LSPs and/or P2MP LSPs. For example, the backup LSP may comprise a previous-hop node (e.g., an internal node 130) of the first egress node 121 and a second egress node 122. The backup LSP may be a partial LSP used to back up the first egress node 121. In an example embodiment, an LSP may be assigned by the first egress node 121 communicating (e.g., via a border gateway protocol (BGP) protocol) a service label to an ingress node. Additionally, a partial LSP may be assigned by a network node along the LSP (e.g., the first egress node 121) communicating the service label to a second egress node 122. The partial LSP may branch off the LSP at the network node along the LSP (e.g., the first egress node 121). As such, the partial LSP may be configured to back up the primary egress node of the primary LSP (e.g., the first egress node 121) but may not be configured to backup all of the network nodes of the primary LSP (e.g., the internal nodes 130).

The first egress node 121 may be configured to send a service label associated with a unique service or application. For example, a service label may be an identifier uniquely associated with a network service, a network application, or a virtual private network (VPN). A network service may be a class of traffic or a class of packets that is associated with a label (e.g., a service label). The network service may use the label to deliver the class of traffic or class of packets to a destination. The first egress node 121 may send the service label to the first ingress node 111, an internal node 130, and/or a second egress node 122, for example, via a protocol such as BGP. Additionally, the first egress node 121 may be configured to send a destination address (e.g., an IP address) for a client node 150 associated with the service label to the second egress node 122. Further, the first egress node 121 may send the address of a backup egress node to the first ingress node 111, an internal node 130, and/or a second egress node 122. The service label may be included in the data traffic from one of the source nodes 140 for the same service before sending the data traffic through the primary LSP by the first ingress node 111. For example, the first ingress node 111 may be configured to receive the data traffic for the primary LSP, to push the service label onto the data traffic, and to send the data traffic via the primary LSP to the client node 150 associated with the service label.

At least one of the second egress nodes 122 may be paired with the first egress nodes 121 and may be designated as a backup egress node for the first egress node 121 to protect against egress node failure. The second egress node 122 may be configured to use the service label as an upstream assigned (UA) label. For example, the second egress node 122 may be configured to receive a service label and a destination address associated with the service label and to create a forwarding entry (e.g., in an LFIB) for a first egress node 121. The forwarding entry may comprise a mapping of the service label to the destination address of the client node 150. Additionally, the forwarding entry may comprise actions for handling the service label (e.g., pop/remove a label).

A previous-hop node may be a network node that precedes a primary egress node along the primary LSP. For example, an internal node 130 may be configured as the previous-hop node for a first egress node 121. The previous-hop node may be configured to receive information about the first egress node 121, the primary LSP, and/or a second egress node 122, to establish a backup LSP for the first egress node 121, to detect a failure in the first egress node 121, and to route data traffic to a client node 150 via the backup LSP.

The backup LSP may be a P2P detour tunnel. The backup LSP may be created by computing a path from the previous-hop node to a second egress node 122, setting up the backup LSP along the computed path, sending a PATH message to the second egress node 122 comprising an egress fault protection message object, receiving a RESV message in response to the PATH message, and creating a forwarding state (e.g., forwarding table) for the backup LSP. The egress fault protection message object may be as described in FIG. 8. The egress fault protection message object may comprise the IP address of the primary egress node and the backup egress node. In an example embodiment, the backup LSP may be established as described in U.S. patent application Ser. No. 12/683,968, titled "Protecting Ingress and Egress of a Label Switched Path." The PATH and RESV messages may be similar to the PATH and RESV messages defined by the Internet Engineering Task Force (IETF) Request for Comments (RFC) 6510.

Figure 2:
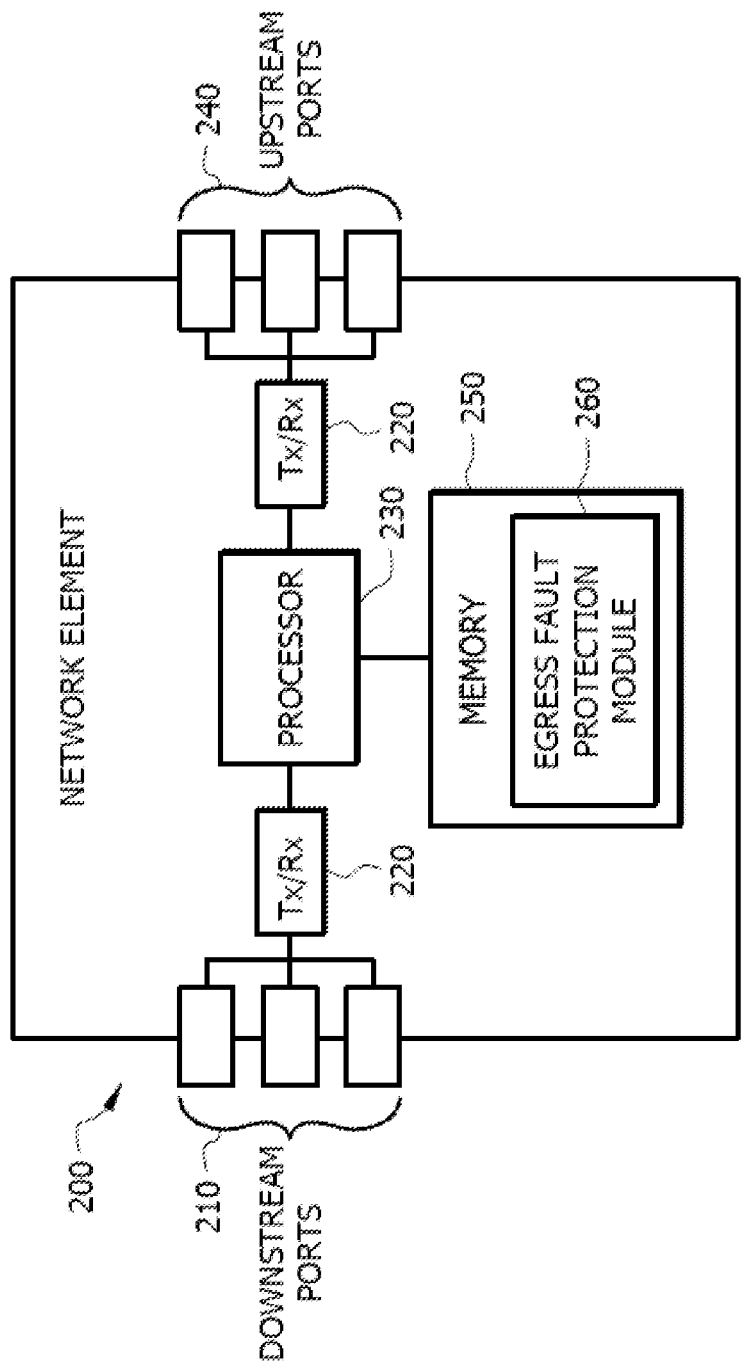
FIG. 2 is a schematic diagram of an example embodiment of a network element.

FIG. 2 is a schematic view of an embodiment of a network element 200 that may be used to transport and process data traffic through a network or a label switched system 100 shown in FIG. 1. At least some of the features/methods described in the disclosure may be implemented in a network element. For instance, the features/methods of the disclosure may be implemented in hardware, firmware, and/or software installed to run on the hardware. The network element may be any device (e.g., a switch, router, bridge, server, client, etc.) that transports data through a network, system, and/or domain. Moreover, the terms network "element," "node," "component," "module," and/or other similar terms may be interchangeably used to generally describe a network device and do not have a particular or special meaning unless otherwise specifically stated and/or or claimed within the disclosure. In one example embodiment, the network element 200 may be an apparatus used to establish an LSP, to communicate labeling instructions, to process data traffic, and/or to communicate data traffic. For example, network element 200 may be an internal node 130 or an egress node 121, 122 as described in FIG. 1.

The network device 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components.

A processor 230 may be coupled to the Tx/Rx 220 and may be configured to process the frames and/or determine which nodes to send (e.g., transmit) the frames. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to implement any of the schemes described herein, including method 600 as described in FIG. 6.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the system and methods described herein (e.g., as a network node). In an example embodiment, the memory module 250 may comprise an egress fault protection module 260 that may be implemented on the processor 230. Alternatively, the egress fault protection module 260 may be implemented directly on the processor 230. The egress fault protection module 260 may be configured to communicate a plurality of labels, to maintain a forwarding table (e.g., an LFIB), generate forwarding entries, and/or to deliver data traffic using the plurality of labels. Communicating a plurality of labels, maintaining a forwarding table, generating forwarding entries, and delivering data traffic using the plurality of labels will be discussed in more detail in FIG. 9.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
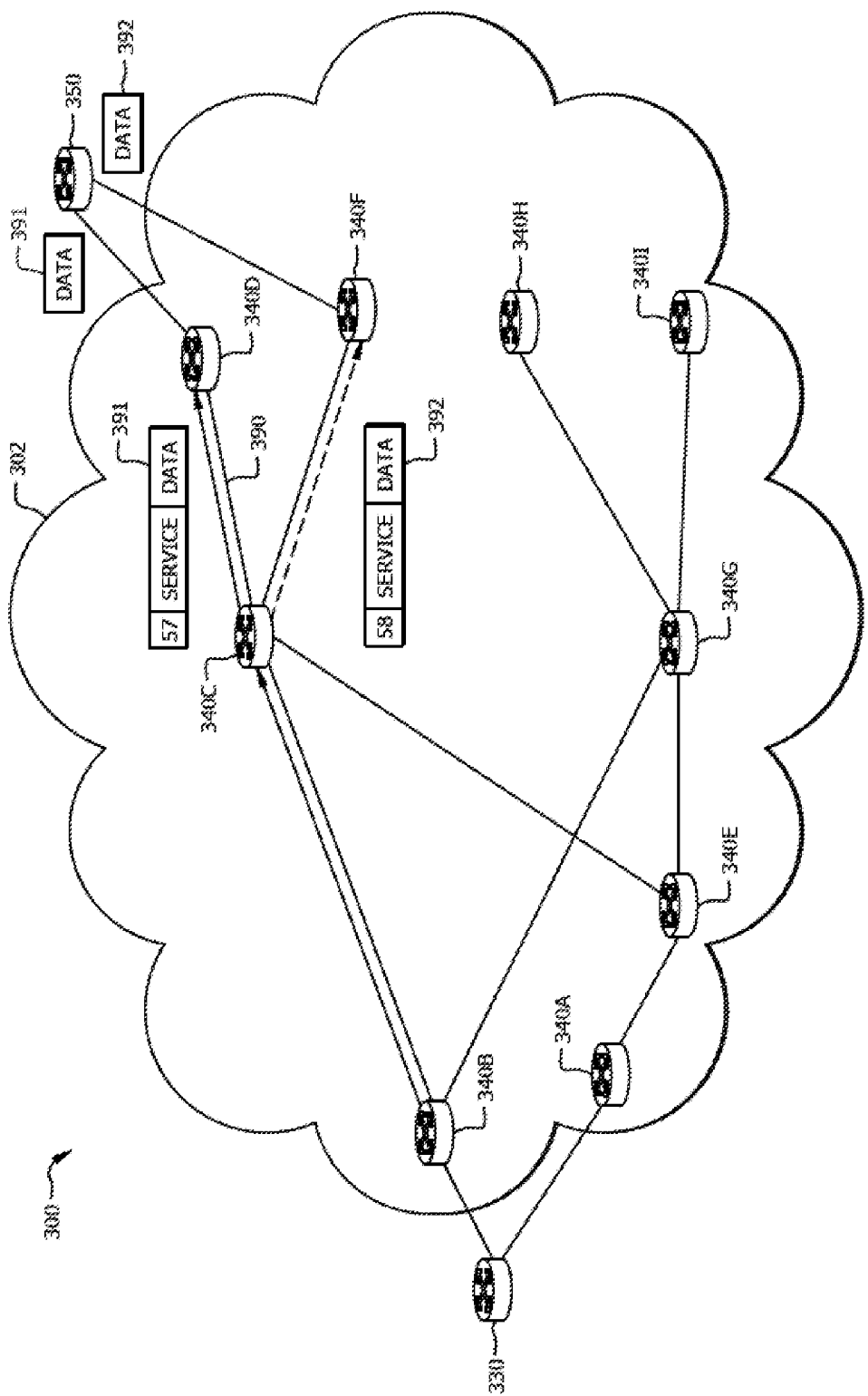
FIG. 3 is an example embodiment of a label switched system employing an egress node protection scheme.

FIG. 3 is an example embodiment of a label switched system 300 employing an egress node protection scheme. The label switched system 300 comprises a label switched network 302 comprising a plurality of network nodes 340A-I, in particular, ingress nodes 340A and 340B, a plurality of internal nodes 340C, 340E, and 340G, and a plurality of egress nodes 340D, 340F, 340H, and 340I. The plurality of network nodes may be substantially similar to the network nodes as described in FIG. 1. Although the label switched network 302 is illustrated comprising the ingress nodes 340A and 340B, the plurality of internal nodes 340C, 340E, and 340G, and the plurality of egress nodes 340D, 340F, 340H, and 340I, in one or more example embodiments, any other suitable configuration and/or combinations thereof may be additionally or alternatively incorporated within the label switched network 302 as would be appreciated by one of ordinary skill in the art upon viewing this disclosure. The label switched network 302 may be in data communication with a source node 330 and a client node 350. The source node 330 and/or a client node 350 may be a network or network node that is external or distinct from a label switched network 302. Alternatively, a source node 330 and/or a client node 350 may be a portion of and/or incorporated within the label switched network 302.

An egress node may be configured as a primary egress node for an LSP, for example, egress node 340D. The primary egress node may be configured to communicate data traffic from the source node 330 to the client node 350. Additionally, the primary egress node may be configured to generate and to communicate a UA label to a backup egress node, as described in FIG. 1. One or more of the plurality of egress nodes (e.g., egress node 340F, egress node 340H, or egress node 340I) may be paired with a primary egress node and configured as a backup egress node for the primary egress node. For example, a backup egress node (e.g., the egress node 340F) may be configured to deliver data traffic to the client node 350 when the primary egress node (e.g., the egress node 340D) fails. For example, the client node 350 may be in data communication with the primary egress node and the backup egress node and may be configured to receive data traffic from the source node 330 via the primary egress node and/or the backup egress node. In one example embodiment, the backup egress node may be predetermined by an operator. Alternatively, the backup egress node may be configured to be selected automatically (e.g., using a path computation element (PCE)) based on network topology information. For example, a PCE may be configured to inform other network nodes of the selected backup egress node.

The label switched system 300 may be configured to employ one or more LSPs (e.g., one or more P2P LSPs or P2MP LSPs) to communicate data traffic from the source node 330 to the client node 350. For example, a primary LSP may comprise the ingress node 340B, the internal node 340C, and the egress node 340D. The egress node 340D of the primary LSP may also be referred to as the primary egress node. The primary LSP is shown using solid arrow lines in FIG. 3. The label switched system 300 may further comprise a backup LSP configured to protect the primary egress node. For example, the backup LSP may be configured to forward traffic from the source node 330 to the client node 350 when the primary egress node of the primary LSP fails. The backup LSP may comprise the internal node 340C and the egress node 340F. The backup LSP may be a partial backup path that branches off from the previous-hop of the egress node 340D in order to protect the primary LSP in the event of an egress node 340D failure. The egress node 340F of the backup LSP may also be referred to as the backup egress node. The backup egress node may not belong to the primary LSP. The backup LSP is shown using a dashed arrow line in FIG. 3.

The label switched network 302 may further comprise one or more failure detection links to detect a network node failure. In a conventional system, a multi-hop bidirectional fault detection (BFD) may be established between the ingress node of a primary LSP and the primary egress node of the primary LSP. As such, any failure along the multi-hop BFD may indicate a failure of the primary egress node, and therefore, such a conventional system may not be reliable to detect a primary egress node failure. The label switched network 302 may comprise a failure detection link between the previous-hop node and the primary egress node. Failure detection links used by the label switched system 300 may include a BFD session, a P2P LSP, and/or any other suitable failure detection link. For example, the failure detection link may comprise a BFD session 390 between the primary egress node and a previous-hop node (e.g., the internal node 340C) of the primary egress node. As such, the previous-hop node of the primary egress node may be configured to detect a primary egress node failure by monitoring the BFD session between the primary egress node and a previous-hop node of the primary egress node.

In normal operation, the source node 330 may be configured to send a data packet 391 to the client node 350 via the primary LSP. The data packet 391 may comprise a primary LSP label, a service label, and a data content portion. Using FIG. 3 as an example, the primary LSP label may be a value of 57 that indicates to route the data packet 391 along the primary LSP. In an example embodiment, the primary egress node may be configured to receive the data packet 391, to pop the primary LSP label and the service label, and to deliver the data packet 391 to the client node 350 in accordance with the service label.

When the internal node 340C detects a failure of the egress node 340D, the internal node 340C may be configured to generate a second data packet 392. The second data packet 392 may comprise a backup LSP label, the service label, and the data content portion. In an example embodiment, the internal node 340C may be configured to swap the primary LSP label for the backup LSP label. The service label and the data content portion may be the same as the data content portion of data packet 391. In an example embodiment, the internal node 340C may switch the data traffic from the primary LSP to the backup LSP substantially simultaneously upon detecting there is a primary egress node fault. Alternatively, the internal node 340C may send the second data packet within about 10 milliseconds (ms), about 20 ms, about 30 ms, about 40 ms, about 50 ms, about 100 ms, about 500 ms, or any other suitable duration of time as would be appreciated by one of ordinary skill in the art upon viewing this disclosure. The backup egress node may be configured to receive the second data packet 392, to locate an LFIB for the primary egress node using the backup LSP label as a context label, to locate a forwarding entry using the service label as a UA label, and to deliver the second data packet 392 to the client node 350 in accordance with the forwarding entry.

Figure 4:
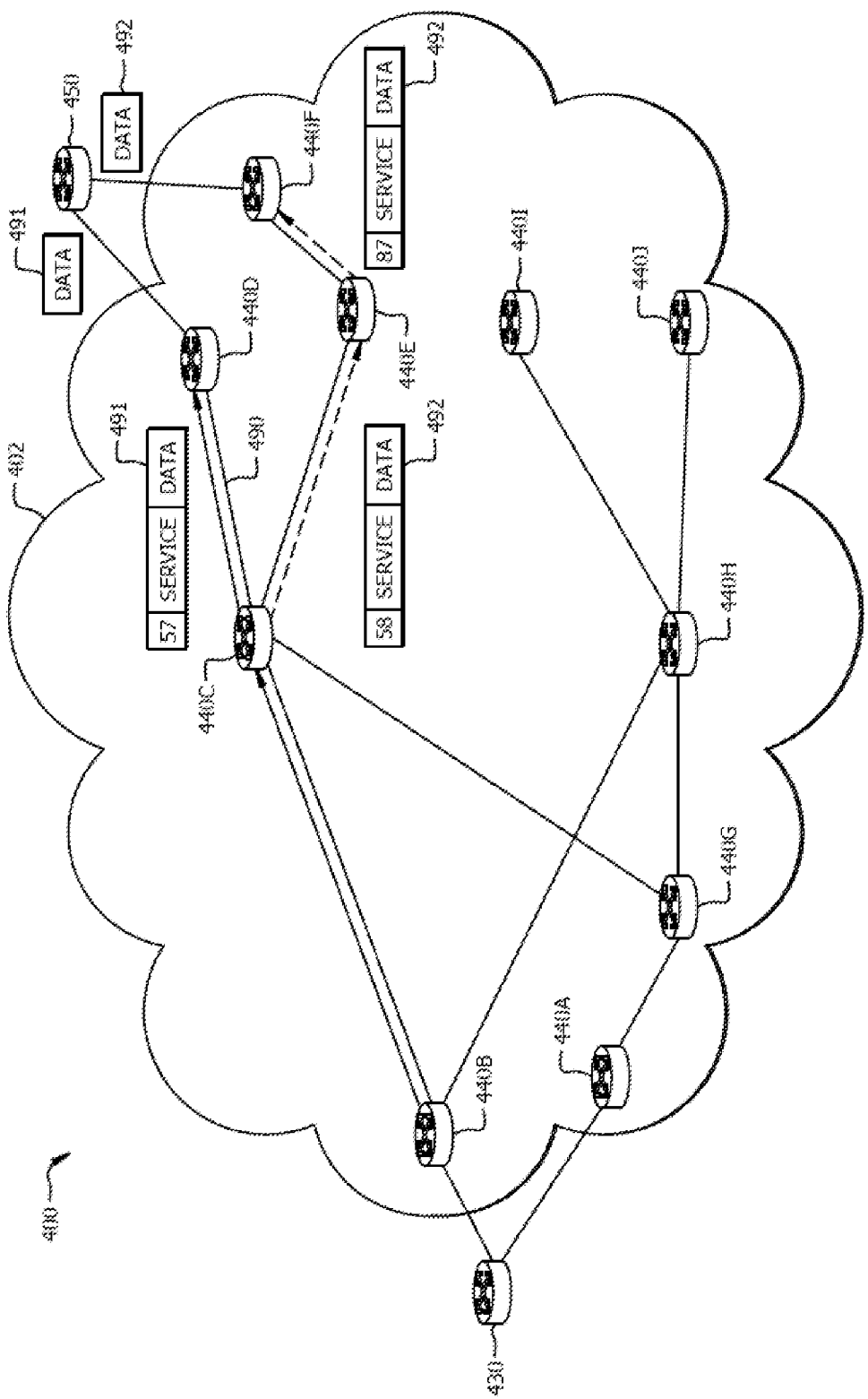
FIG. 4 is another example embodiment of a label switched system employing an egress node protection scheme.

FIG. 4 is another example embodiment of a label switched system 400 employing an egress node protection scheme. The label switched system 400 comprises label switched network 402 comprising a plurality of network nodes 440A-J, in particular, ingress nodes 440A and 440B, a plurality of internal nodes 440C, 440E, 440G, and 440H, and a plurality of egress nodes 440D, 440F, 440I, and 440J. The plurality of network nodes may be substantially similar to the network nodes as described in FIG. 1. Although the label switched network 402 is illustrated comprising the ingress nodes 440A and 440B, the plurality of internal nodes 440C, 440E, 440G, and 440H, and the plurality of egress nodes 440D, 440F, 440I, and 440J, in one or more example embodiments, any other suitable configuration and/or combinations thereof may be additionally or alternatively incorporated within the label switched network 402 as would be appreciated by one of ordinary skill in the art upon viewing this disclosure. The label switched network 402 may be in data communication with a source node 430 and a client node 450. The source node 430 and/or a client node 450 may be substantially similar to the source node 330 and the client node 350 as described in FIG. 3. The label switched system 400 comprises a primary LSP, shown as a solid arrow line, which is substantially similar to the primary LSP as described in FIG. 3. The backup LSP comprises the internal node 440C, the internal node 440E, and the egress node 440F. The internal node 440E and the backup egress node may not belong to the primary LSP. The backup LSP is shown using a dashed arrow line in FIG. 4. As such, data traffic may be communicated from the source node 430 to the client node 450 via the primary LSP and the backup LSP. For example, communicating data traffic (e.g., a data packet 491) using the primary LSP under normal operation may be substantially similar to using the primary LSP to communicate data traffic under normal operation as described in FIG. 3.

The internal node 440C may be configured to detect a failure of the egress node 440D. For example, the internal node 440C may employ a BFD session 490 between the internal node 440C and the egress node 440D. When the internal node 440C detects a failure of the egress node 440D, the internal node 440C may be configured to generate a second data packet 492. The second data packet 492 may comprise a backup LSP label, the service label, and the data content portion. In an example embodiment, the internal node 440C may be configured to swap the primary LSP label for the backup LSP label. The service label and the data content portion may be the same as the data content portion of data packet 491. The internal node 440E may be configured to receive the second data packet 492, to update the backup LSP label, and to send the second data packet 492 to the next-hop node (e.g., the backup egress node). For example, the internal node 440E may be configured to update the backup LSP label by swapping the backup LSP label from a value of 58 to a value of 87 indicating the next-hop node. The backup LSP label value may be determined by a table, algorithm, or any other method as would be appreciated by one of ordinary skill in the art upon viewing this disclosure. The backup egress node may be configured to receive the second data packet 492, to locate an LFIB for the primary egress node using the backup LSP label as a context label, to locate a forwarding entry using the service label as a UA label, and to deliver the second data packet 492 to the client node 450 in accordance with the forwarding entry.

Figure 5:
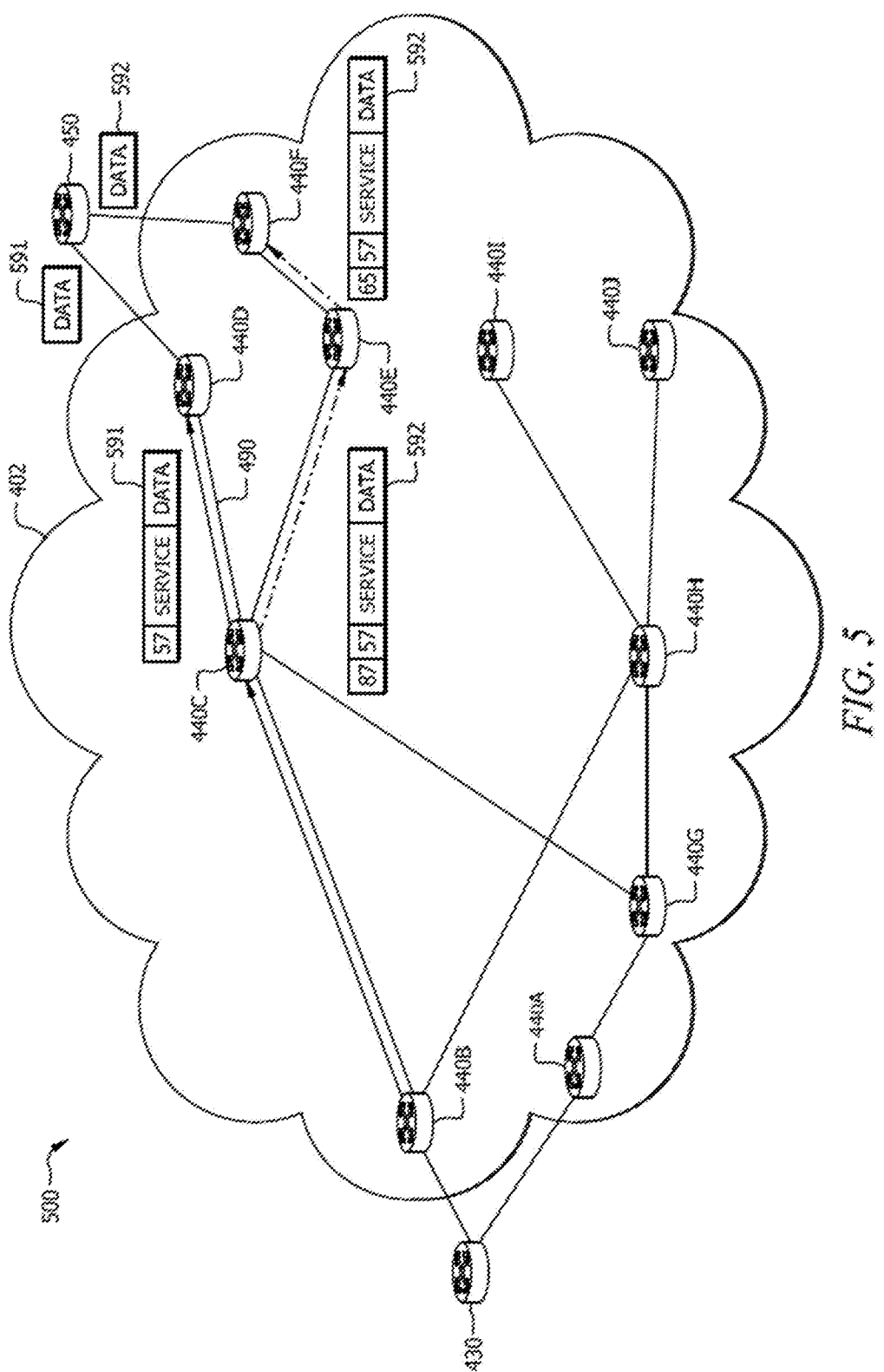
FIG. 5 is another example embodiment of a label switched system employing an egress node protection scheme.

FIG. 5 is another example embodiment of a label switched system 500 employing an egress node protection scheme. The label switched system 500 comprises the label switched network 402 in data communication with the source node 430 and the client node 450. Label switched system 500 may be configured substantially similar to label switched system 400 as described in FIG. 4. The label switched system 500 comprises a primary LSP, shown as a solid arrow line, and a backup LSP, shown as a dashed arrow line, which are substantially similar to the primary LSP and the backup LSP as described in FIG. 4. As such, data traffic may be communicated from the source node 430 to the client node 450 via the primary LSP and the backup LSP. For example, communicating data traffic (e.g., a data packet 591) using the primary LSP under normal operation may be substantially similar to using the primary LSP to communicate data traffic under normal operation as described in FIG. 3.

When the internal node 440C detects a failure of the egress node 440D, the internal node 440C may be configured to generate a second data packet 592. The second data packet 592 may comprise a backup LSP label, the service label, and the data content portion. In an example embodiment, the internal node 440C may be configured to swap the primary LSP label for the backup LSP label and to add one or more additional labels indicating the primary LSP between the internal node 440C and the primary egress node 440D. For example, the primary LSP label (e.g., a label with a value of 57) may be added to (e.g., under) the backup LSP label (e.g., a label with a value of 87) to indicate that the data packet is for the primary LSP. The service label and the data content portion may be the same as the data content portion of data packet 591. The internal node 440E may be configured to receive the second data packet 592, to update the backup LSP label, and to send the second data packet 592 to the next-hop node (e.g., the backup egress node). For example, the internal node 440E may be configured to update the backup LSP label by swapping a label (e.g., the label with a value of 87) from the stack of labels for another label (e.g., a label with a value of 65). The backup egress node may be configured to receive the second data packet 592, to locate an LFIB for the primary egress node using the backup LSP label (e.g., the label with the value of 65) as a context label, to locate a forwarding entry using the service label as a UA label, and to deliver the second data packet 592 to the client node 450 in accordance with the forwarding entry.

Figure 6:
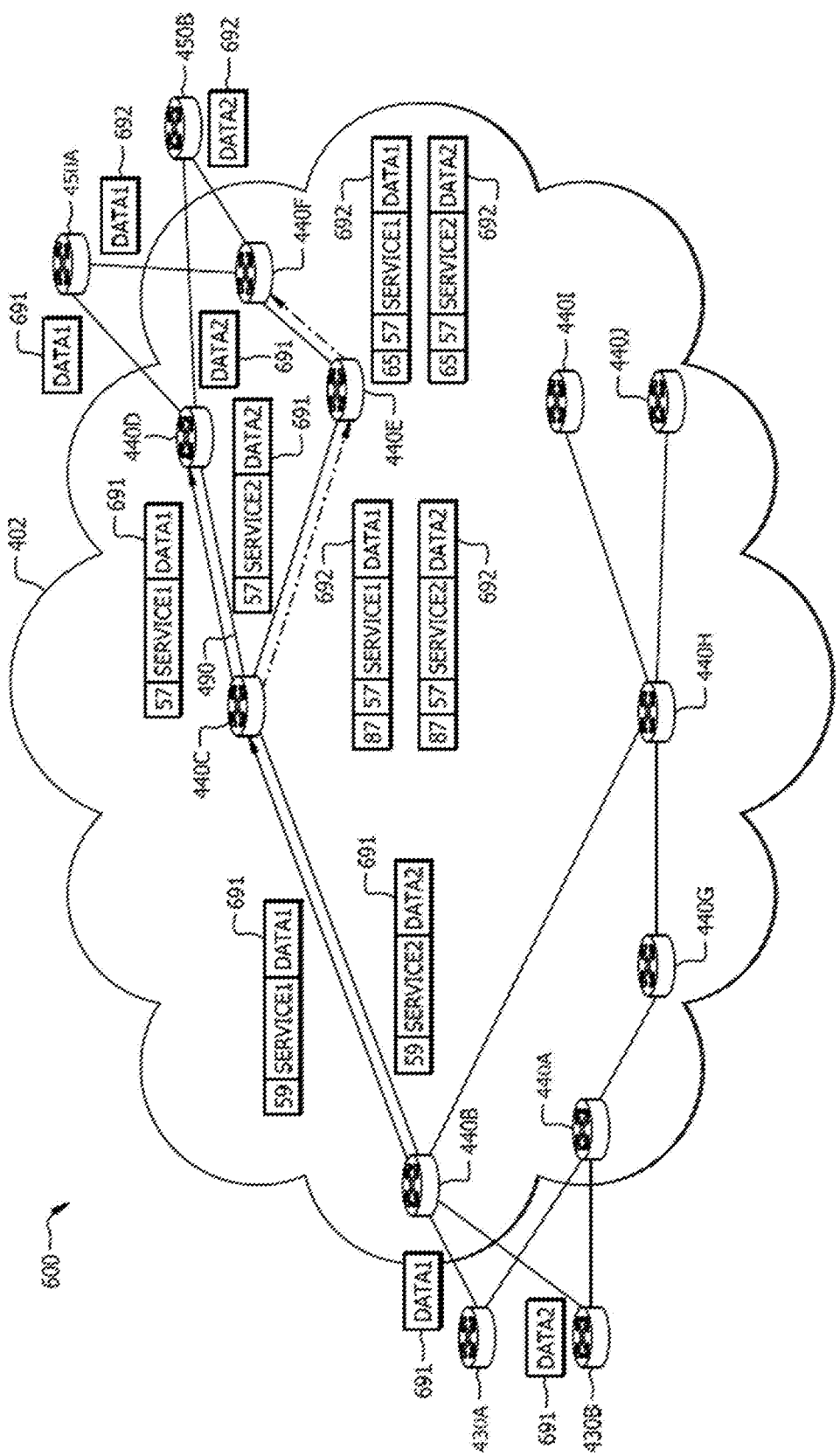
FIG. 6 is another example embodiment of a label switched system employing an egress node protection scheme.

FIG. 6 is another example embodiment of a label switched system 600 employing an egress node protection scheme. The label switched system 600 comprises the label switched network 402 in data communication with the source nodes 430A and 430B and the client nodes 450A and 450B. The source nodes 430A and 430B may be in data communication with the ingress nodes 440A and 440B and may be configured to deliver traffic (e.g., data packet 691) to the ingress node 440A and/or ingress node 440B. The client nodes 450A and 450B may be in data communication with the egress nodes 440D and 440F and may be configured to receive data traffic from the egress node 440D and/or the egress node 440F. The source node 430A, the source node 430B, the client node 450A, and/or the client node 450B may be a network or network node that is external or distinct from the label switched network 402. Alternatively, the source node 430A, the source node 430B, the client node 450A, and/or the client node 450B may be a portion of and/or incorporated within the label switched network 402. The label switched system 600 comprises a primary LSP, shown as a solid arrow line, and a backup LSP, shown as a dashed arrow line, which are substantially similar to the primary LSP and the backup LSP as described in FIG. 4. As such, data traffic (e.g., data packet 691) may be communicated from a source node to a client node via the primary LSP and the backup LSP.

In an example embodiment, the ingress node 440B of the primary LSP may be configured to push or add a plurality of labels onto the data packet 691. For example, the data packet 691 may comprise a primary LSP label, a service label, and a data content portion. Using FIG. 6 as an example, the primary LSP label may initially be a value of 59 that indicates to route the data packet 691 along the primary LSP. Additionally, the service label may indicate the destination for the data packet 691. For example, a first service label may indicate the data packet 691 is to be delivered to the client node 450A and a second service label may indicate the data packet 691 is to be delivered to the client node 450B. The internal node 440C may be configured to receive the data packet 691, to update the primary LSP label, and to send the data packet 691 to the next-hop node (e.g., the primary egress node). For example, the internal node 440C may be configured to update the primary LSP label by swapping the primary LSP label from a value of 59 to a value of 57. The primary egress node may be configured to receive the data packet 691, to pop the primary LSP label and the service label, and to deliver the data packet 691 in accordance with the forwarding entry associated with the service label.

When the internal node 440C detects a failure of the egress node 440D, the internal node 440C may be configured to generate a second data packet 692. The second data packet 692 may comprise a backup LSP label, the service label, and the data content portion. In an example embodiment, the internal node 440C may be configured to swap the primary LSP label for the backup LSP label and to add one or more additional labels indicating the primary LSP between the internal node 440C and the primary egress node 440D. For example, the primary LSP label (e.g., a label with a value of 57) may be added to (e.g., under) the backup LSP label (e.g., a label with a value of 87) to indicate that the data packet is for the primary LSP. The service label and the data content portion may be the same as the data content portion of data packet 691. The internal node 440E may be configured to receive the second data packet 692, to update the backup LSP label, and to send the second data packet 692 to the next-hop node (e.g., the backup egress node). For example, the internal node 440E may be configured to update the backup LSP label by swapping a label (e.g., the label with a value of 87) from the stack of labels with another label (e.g., a label with a value of 65). The backup egress node may be configured to receive the second data packet 692, to locate an LFIB for the primary egress node using the backup LSP label as a context label, to identify that the data packet belongs to the primary LSP (e.g., using the primary LSP label) to locate a forwarding entry using the service label as a UA label, and to deliver the second data packet 692 in accordance with the forwarding entry associated with the service label.

Figure 7:
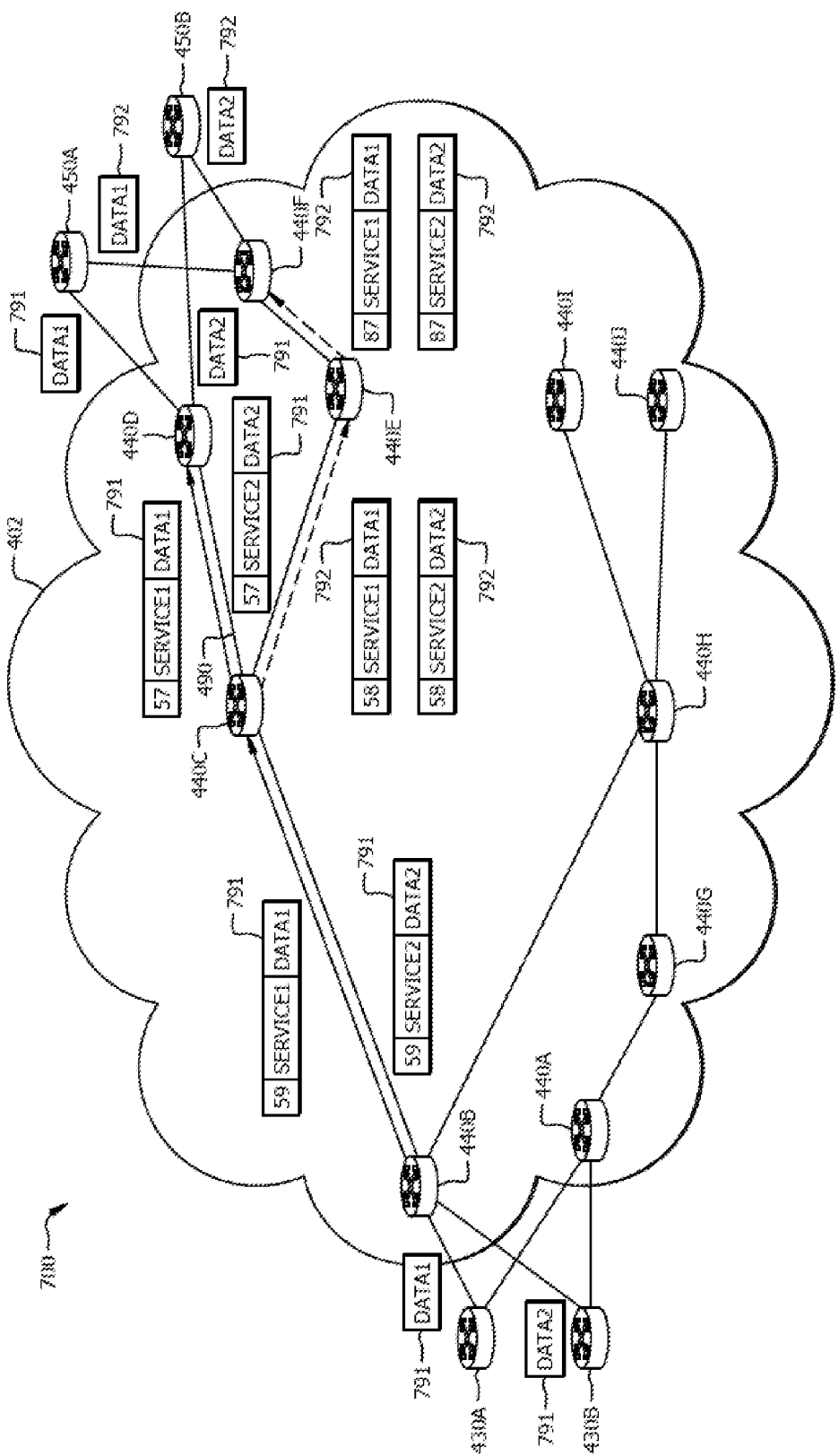
FIG. 7 is another example embodiment of a label switched system employing an egress node protection scheme.

FIG. 7 is another example embodiment of a label switched system 700 employing an egress node protection scheme. The label switched system 700 comprises the label switched network 402 in data communication with the source nodes 430A and 430B and the client nodes 450A and 450B. Label switched system 700 may be configured substantially similar to label switched system 600 as described in FIG. 6. The label switched system 700 comprises a primary LSP, shown as a solid arrow line, and a backup LSP, shown as a dashed arrow line, which are substantially similar to the primary LSP and the backup LSP as described in FIG. 6. As such, data traffic may be communicated from a source node to a client node via the primary LSP and the backup LSP. For example, communicating data traffic (e.g., a data packet 791) using the primary LSP under normal operation may be substantially similar to using the primary LSP to communicate data traffic under normal operation as described in FIG. 6.

When the internal node 440C detects a failure of the egress node 440D, the internal node 440C may be configured to generate a second data packet 792. The second data packet 792 may comprise a backup LSP label, the service label, and the data content portion. In an example embodiment, the internal node 440C may be configured to swap the primary LSP label for the backup LSP label. The service label and the data content portion may be the same as the data content portion of data packet 791. The internal node 440E may be configured to receive the second data packet 792, to update the backup LSP label, and to send the second data packet 792 to the next-hop node (e.g., the backup egress node). For example, the internal node 440E may be configured to update the backup LSP label by swapping the backup LSP label from a value of 58 to a value of 87. The backup egress node may be configured to receive the second data packet 792, to locate an LFIB for the primary egress node using the backup LSP label as a context label, to locate a forwarding entry using the service label as a UA label, and to deliver the second data packet 792 in accordance with the forwarding entry.

Figure 8:
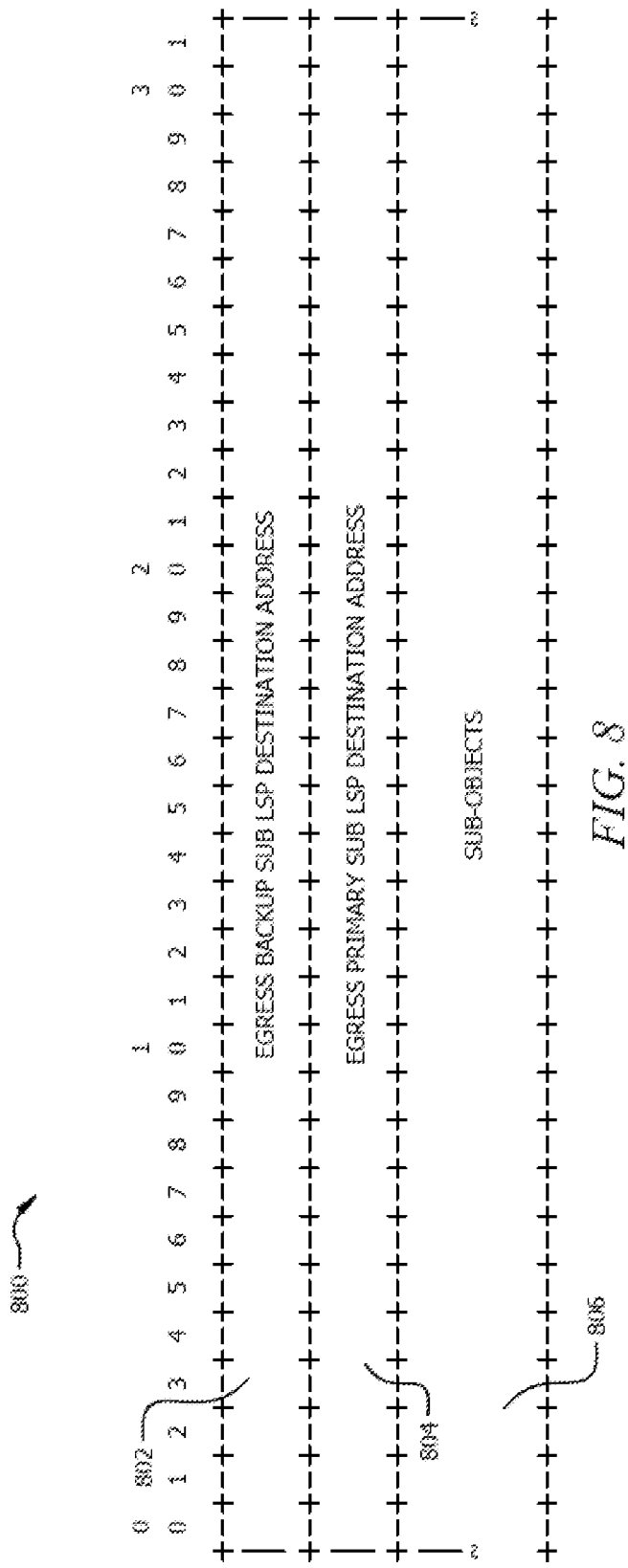
FIG. 8 is an example embodiment of a message object.

FIG. 8 is an example embodiment of a message object 800. Message object 800 may be employed to signal egress fault protection and/or to provide control information to a backup egress node to provide egress fault protection. Message object 800 may be configured to be an independent message or incorporated within another message. For example, message object 800 may be inserted into a PATH and/or RESV message being communicated between an upstream node (e.g., an ingress node or an internal node) and the primary egress node and/or the backup egress node. Message object 800 comprises an egress backup sub-LSP destination address field 802, an egress primary sub-LSP destination address field 804, and a sub-objects field 806. The egress backup sub-LSP destination address field 802 may comprise a backup egress node IP address (e.g., an IP version 4 (IPv4) or an IP version 6 (IPv6) address). For example, the egress backup sub-LSP destination address field 802 may be about four bytes long for an IPv4 address and about 16 bytes long for an IPv6 address. The sub-objects field 806 may be about 24 bytes long and may comprise one or more sub-objects which may comprise information for establishing a backup LSP and/or for controlling a backup LSP. For example, the sub-objects field 806 may comprise a service label, an IP address of a client node, identification information for the primary LSP, and/or instructions to use an LSP label (e.g., a backup LSP label) as a context label to locate an LFIB and to use a service label as a UA label to locate a forwarding entry in the LFIB, which forwards data (e.g., using the IP address of the client node) to the client node.

Figure 9:
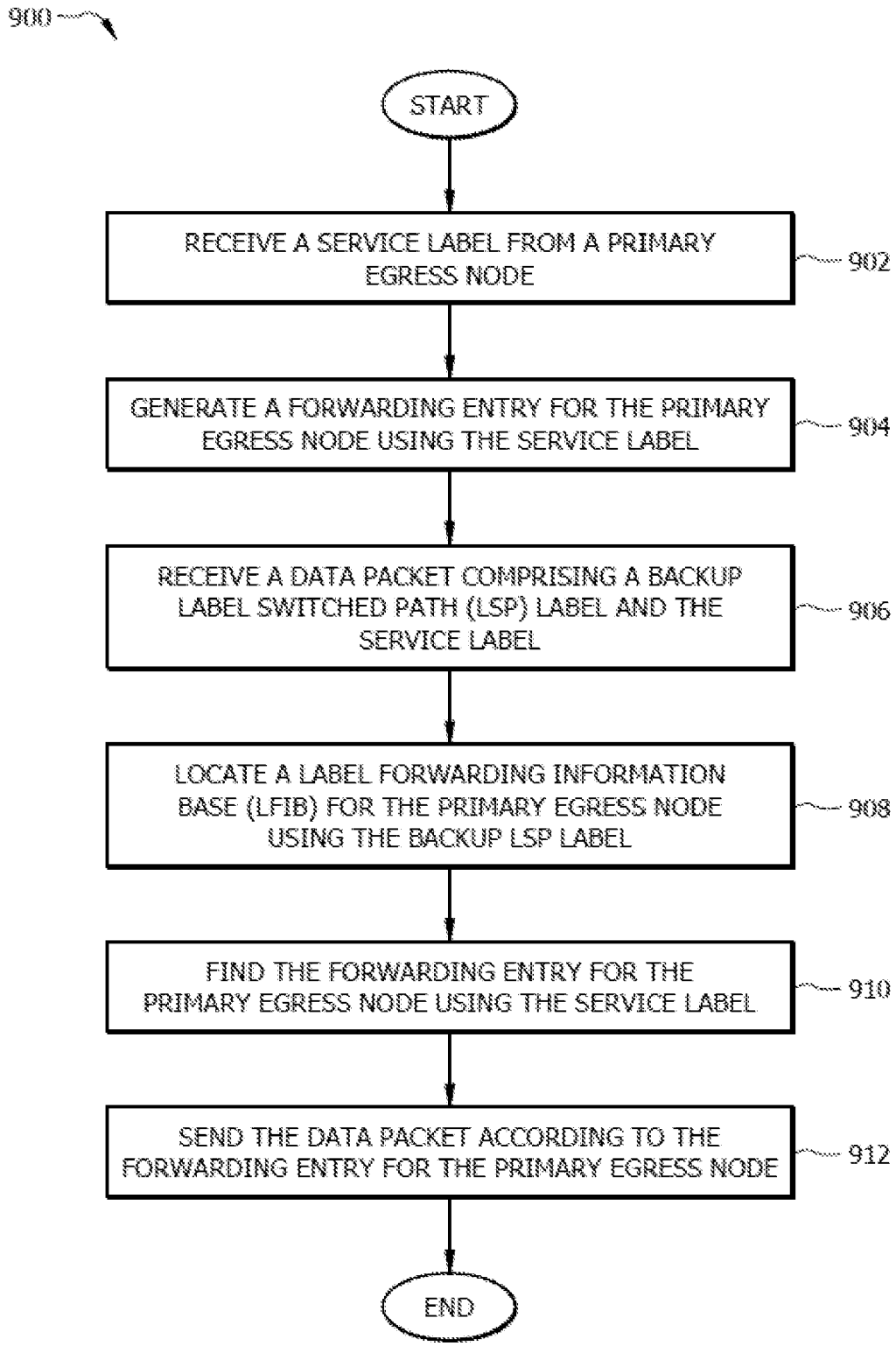
FIG. 9 is a flowchart of an example embodiment of an egress fault protection method.

FIG. 9 is a flowchart of an example embodiment of an egress fault protection method 900. In an example embodiment, a backup egress node may be configured to employ method 900 to protect the primary LSP in the event of a primary egress node failure. In an example embodiment, a previous-hop node may send a PATH message comprising a message object (e.g., message object 800 as described in FIG. 8) to a backup egress node to establish a backup LSP with the backup egress node. Additionally, the previous-hop node may send data traffic to a primary egress node via the primary LSP and may not send data traffic to the backup egress node via the backup LSP during normal operation. The previous-hop node may detect a primary egress node failure and may switch the data traffic from the primary LSP to the backup LSP to deliver the data traffic via the backup egress node. Method 900 may be used to control data traffic delivery from a source node to a client node in response to detecting a failure involving the primary egress node of the primary LSP.

At step 902, method 900 may receive a service label from a primary egress node for the primary LSP. For example, a backup egress node may receive a service label comprising a service label associated with a unique service or application, a destination address for the client node, and a source address for a primary egress node. At step 904, method 900 may generate a forwarding entry for the primary egress node using the service label. For example, the backup egress node may create a forwarding entry in an LFIB associated with the primary egress node that maps the service label to the destination address of a client node. Additionally, the forwarding entry may comprise instructions to pop one or more labels prior to sending a data packet. At step 906, method 900 may receive a data packet comprising a backup LSP label, the service label, and a data content portion. For example, the backup egress node may receive a data packet via the backup LSP. At step 908, method 900 may locate the LFIB for the primary egress node using the backup LSP label. For example, the backup egress node may use the backup LSP as a context label to locate the LFIB associated with the primary egress node. At step 910, method 900 may find the forwarding entry for the primary egress node using the service label. For example, the backup egress node may use the service label as a UA label to locate a forwarding entry in the LFIB associated with the primary egress node to determine the destination address of a client node. At step 912, method 900 may send the data packet according to the forwarding entry for the primary egress node. For example, the backup egress node may send the data packet to the client node in accordance with the forwarding entry in the LFIB associated with the primary egress node.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A method implemented by an internal node for primary egress node protection for packets being routed to a client node, comprising:
  receiving a first packet comprising a primary label switched path (LSP) label and a service label;
  swapping the primary LSP label for a backup LSP label to generate a second packet, wherein the second packet comprises the backup LSP label and the service label, wherein the backup LSP label is a label assigned to a partial backup LSP, wherein the partial backup LSP is configured to branch off a portion of a primary LSP in order to protect the primary LSP in the event of the primary egress node failure, and wherein the internal node is an upstream node of the primary egress node along the primary LSP and is also an upstream node of a backup egress node along the partial backup LSP;
  delivering the second packet through the backup egress node to the client node via the partial backup LSP; and
  sending a message to the backup egress node, wherein the message comprises information for establishing the partial backup LSP, and wherein the information comprises the service label and an Internet Protocol (IP) address of the client node.

2. The method of claim 1, wherein the information comprises an Internet Protocol (IP) address of the backup egress node.

3. The method of claim 1, wherein the information comprises identification information of the primary LSP.

4. The method of claim 1, wherein the information comprises instructions to use the backup LSP label as a context label to find a label forwarding information base (LFIB) and use the service label to deliver the packets to the client node based on the LFIB.

5. The method of claim 1, wherein the message is a PATH message.

6. The method of claim 1, wherein the service label is a virtual private network (VPN) label.

7. A method implemented by a backup egress node for primary egress node protection for packets being routed to a client node, comprising:
  receiving, from an internal node of a network via a partial backup label switched path (LSP), a packet comprising a backup LSP label and a service label, wherein the partial backup LSP is configured to branch off of a portion of a primary LSP in order to protect the primary LSP in the event of the primary egress node failure, and wherein the internal node is an upstream node of the primary egress node along the primary LSP and is also an upstream node of the backup egress node along the partial backup LSP;
  using the backup LSP label to find a label forwarding information base (LFIB);
  delivering the packet to the client node using the service label based on the LFIB; and
  receiving a message comprising information for establishing the partial backup LSP, wherein the information comprises the service label and an Internet Protocol (IP) address of the client node.

8. The method of claim 7, wherein the information comprises an IP address of the backup egress node.

9. The method of claim 7, wherein the information comprises identification information of the primary LSP.

10. The method of claim 7, wherein the information comprises instructions to use the backup LSP label as a context label to find a label forwarding information base (LFIB) and use the service label to deliver the packets to the client node based on the LFIB.

11. The method of claim 7, wherein the message is a PATH message.

12. The method of claim 7, wherein the LFIB comprises a mapping of the service label to an address of the client node.

13. A backup egress node for primary egress node protection for packets being routed to a destination node, comprising:
  a receiver configured to:
    receive, from an internal node of a network via a partial backup label switched path (LSP), a packet comprising a backup LSP label and a service label, wherein the partial backup LSP is configured to branch off of a portion of a primary LSP in order to protect the primary LSP in the event of the primary egress node failure, and wherein the internal node is an upstream node of the primary egress node along the primary LSP and is also an upstream node of the backup egress node along the partial backup LSP; and
    receive a message comprising information for establishing the partial backup LSP, wherein the information comprises the service label and an Internet Protocol (IP) address of a client node;
  a processor coupled to a memory and the receiver, wherein the memory comprises computer executable instructions stored on a non-transitory computer readable medium that, when executed by the processor, cause the processor to:
    use the backup LSP label to find a label forwarding information base (LFIB); and
  a transmitter configured to:
    deliver the packet to the client node using the service label based on the LFIB.

14. The backup egress node of claim 13, wherein the information comprises an IP address of the backup egress node.

15. The backup egress node of claim 13, wherein the information comprises identification information of the primary LSP.

16. The backup egress node of claim 13, wherein the information comprises instructions to use the backup LSP label as a context label to find the LFIB and use the service label to deliver the packets to the client node based on the LFIB.

17. The backup egress node of claim 13, wherein the message is a PATH message.

18. The backup egress node of claim 13, wherein the LFIB comprises a mapping of the service label to an address of the client node.

19. The backup egress node of claim 13, wherein the service label is a virtual private network (VPN) label.

* * * * *